United States Patent [19]

Ohuchi

[11] Patent Number: 5,299,299
[45] Date of Patent: Mar. 29, 1994

[54] SCAN LINE FULL FIGURE FILLING DEVICE FOR DISPLAY UNITS AND PRINTERS

[75] Inventor: Mitsurou Ohuchi, Tokyo, Japan

[73] Assignee: NEC Corporation, Tokyo, Japan

[21] Appl. No.: 940,187

[22] Filed: Sep. 3, 1992

[30] Foreign Application Priority Data

Sep. 6, 1991 [JP] Japan .................................. 3-226720

[51] Int. Cl.⁵ ........................................ G06F 15/62
[52] U.S. Cl. ..................................... 395/126; 395/133; 395/135; 395/141; 395/162; 395/163
[58] Field of Search ............... 395/119, 120, 125, 126, 395/141-143, 145, 149, 133-135, 162, 163

[56] References Cited

U.S. PATENT DOCUMENTS 5,016,001 5/1991 Minasawa et al. ............... 395/142 X
5,025,405 6/1991 Swanson ......................... 395/126 X Primary Examiner—Gary V. Harkcom
Assistant Examiner—Almis Jankus
Attorney, Agent, or Firm—Whitham & Marhoefer

[57] ABSTRACT

A figure filling device fills a figure in memory defined by X-Y coordinate scan line by scan line with reference to a specified pattern. In the filling of a new scan line, the coordinate data for the ends of the new scan line, for the ends of the previously processed scan line and for the reference point of the previous pattern are subjected to a certain processing so that the coordinate data for the reference point of the new pattern is determined. The filling device determines the address in the memory corresponding to the coordinates for the reference point of the new pattern and the address on the memory corresponding to the coordinates for the ends of the new scan line. A filling pattern is read out of the pattern address in the memory and the scan line data is read out of the scan line address on the memory so that they are subjected to a predetermined operation. The result is written to the scan line address.

5 Claims, 5 Drawing Sheets

TILING PATTERN COORDINATE SYSTEM

FILLED AREA COORDINATE SYSTEM

PREPROCESSING TIME

|  | CONVENTIONAL METHOD | PRESENT INVENTION |
|---|---|---|
| STEP 200 | 0 | 2CLK |
| STEP 201 | 5~6LOOP | 1LOOP |
| STEP 202 | 0 | 2CLK |
| STEP 203 | 6~7LOOP | 1LOOP |
| STEP 204 | 3CLK | 3CLK |

SCAN LINE FULL FIGURE FILLING DEVICE FOR DISPLAY UNITS AND PRINTERS

BACKGROUNDS OF THE INVENTION

1. Field of the Invention

The present invention relates to a figure filling device applied to display units and printers and particularly relates to a figure filling device capable of pasting arbitrary tiling patterns in so-called "scan line fill" processing where scanned lines on the memory defined by X-Y coordinates are filled one by one.

2. Description of the Prior Art

In recent years, software for attractive presentation for use on office automation machines such as personal computers, word processors and workstations has become available. Such software not only expresses characters, graphs and tables but also more complicatedly shaped figures on the display screen. When such displayed images are printed, all figures are represented as polygons with their internal areas filled, since printers usually have much higher resolution—several times the resolution of display units. Specifically, a line having a width of one pixel is too thin to use because of high resolution, and it is necessary to always use thick lines or squares as processing units. There are several methods to fill the inside of polygons including squares, but any method requires scan line fill at the last stage. Therefore, the throughput of the entire system largely depends on the speed of the scan line fill processing.

Conventional software as described above is capable of filling figures not only with a single color but also with arbitrarily tiling patterns by referring them. A tiling pattern is a rectangular pattern with a certain size placed like a tile to fill the area subjected to fill processing. To keep proper continuance of patterns, it is necessary to sequentially determine the location to be referred to in the tiling pattern when performing scan line fill.

Conventional methods to determine the pattern reference location are described here. One of such methods limits the tiling patterns to those with 16×16 or 32×32 pixels for simple processing. For example, suppose 16 bits constitute one word and 16×16 pixels make a tiling pattern in a monochrome device treating one pixel as one bit. In this case, regardless of the X coordinate of the start point of the scan line, the same word data is always used for horizontal direction. It is necessary to determine firstly which of the 16 word data in the Y direction is to be selected, but this can be decided by the lower four bits of the Y coordinate of the start point, and the calculation is quite simple.

In another method where tiling patterns can be of any size, the processing becomes quite troublesome. Firstly, it is required to determine the point on the tiling pattern to which the drawing start point of the scan line corresponds. The X coordinate of the drawing start point is divided by the vertical width of the tiling pattern to obtain the remainder, which is used as the X coordinate on the pattern. Then, the Y coordinate of the drawing start point is divided by the height of the tiling pattern to obtain the remainder, which is used as the Y coordinate on the pattern. This means that two divisions are required. Divisions are generally performed by a restoring method. In this method, the dividend and the divisor are aligned for the number of digits first, and the divisor is shifted to the left one bit by one bit to obtain the number of shifts required until the divisor exceeds the dividend. Then, with shifting the divisor to the right, the dividend is subjected to subtraction. If the result is negative, the divisor is added again. The value left after such shifting and subtraction repeated for the number of shifts as determined above is the remainder.

As mentioned above, recent software programs feature desk top publishing, desk top presentation or other similar functions and are capable of fine and beautiful drawing. Naturally, any size of tiling patterns can be defined in such programs. Therefore, it is required to improve the speed of scan line fill processing. In addition, with WYSIWYG (What you see is what you get) becoming popular, it is desired that the image on the display screen and the image provided by the printer give the same impression. To obtain the same impression image irrespective of the resolution of the printing device such as a printer, the resolution can be arbitrarily changed. It is required to change the size of the filing pattern in addition to the conversion of the coordinate data for the figure in order to obtain the same image using different devices with different resolutions. Therefore, it is now becoming more important to fill the figures using arbitrary tiling patterns.

In an application of scan line fill, scan lines each having a length of some dots are continuously drawn (for filling). A typical example is the outline font where the outline of a character is expressed with straight and curved lines and the coordinates of those segments are kept as the original information. The outline font is now becoming popular as one of the basic functions for word processors. Drawing in the outline font function is deemed to be filling of polygons, and can be reduced to the drawing for each of the horizontal lines, or in other words, the scan line fill. Since a character usually has a size of 60 dots×60 dots approximately, it is easily understood that the number of dots continuously existing on a single scan line is often several dots. Further, in division into scan lines, adjacent segments are continuously generated. The segment filling processing itself requires only a short time since each segment has only a dozen dots at most. Therefore, the essential point in such application is the speed of calculation to determine the reference start point of the filling pattern. When the conventional method is used to determine the remainder, it takes time in proportion to the number of significant digits of the dividend and the divisor; this means that even when the filling itself requires only a few clocks, determination of the pattern reference start point needs some tens of clocks, resulting in lengthy processing time.

SUMMARY OF THE INVENTION

An object of the present invention is to provide a filling device which enables reduction of overhead in remainder calculation and thereby improves the speed of processing.

According to a preferred embodiment of the present invention to attain the above object, a figure filling device to fill a figure on the memory defined by X-Y coordinates scan line by scan line with reference to the specified pattern comprises a coordinate storage means to store the coordinate data for the ends of the scan line to be newly filled, the coordinate data for the ends of the previously processed scan line, and the coordinate data for the reference point of the previous pattern, a pattern coordinate determination means to determine the coordinate data for reference point of the new pattern by operating the coordinate data for the ends of the scan line to be newly filled, the coordinate data for the ends of the previously processed scan line and the coordinate data for the reference point of the previous pattern stored in said coordinate storage means in filling of a new scan line, a pattern address determination means to determine the address on the memory corresponding to the coordinate of said reference point of the new pattern, a scan line address determination means to calculate the address on the memory corresponding to the coordinate of the ends of said newly filled scan line, a data processing means to read a filling pattern from said pattern address on the memory and scan line data from said scan line address on the memory, to perform predetermined processing using said filling pattern and said scan line data and to write the result to said scan line address, and an address update means to update said pattern address and said scan line address.

According to a further preferred embodiment, the pattern coordinate determination means uses the remainder from division where the value obtained by adding the difference between the coordinates for the ends of said new scan line from the coordinates for the ends of said previously processed scan line to said reference point of the previous pattern by the height and the width of said new scan line as the coordinate data of the reference point of the new pattern.

According to another preferred embodiment, the processing where said pattern coordinate determination means determines the coordinates for the reference point of the new pattern comprises a procedure to subtract the Y coordinate for the ends of said new scan line from the Y coordinate for the ends of said previous scan line and to add the Y coordinate of the reference point of said previous pattern, a procedure to take the remainder from the division to divide the result of the above operation regarding the Y coordinate by the height of the new pattern as the Y coordinate for the reference point of the new pattern, a procedure to subtract the X coordinate of the ends of said new scan line from the X coordinate of the ends of said previous scan line and to add the X coordinate for the reference point of said previous pattern and a procedure to take the remainder from the division to divide the result of the above operation regarding the X coordinate by the height of the new pattern as the X coordinate for the reference point of the new pattern.

According to still another embodiment according to the present invention to attain the above object, a figure filling device comprises a first processor provided with a coordinate storage means to store the coordinate data for the ends of the scan line to be newly filled, the coordinate data for the ends of the previously processed scan line, and the coordinate data for the pattern reference point, a coordinate determination means to determine the coordinate data for reference point of the new pattern by operating the coordinate data for the ends of the scan line to be newly filled, the coordinate data for the ends of the previously processed scan line and the coordinate data of the previous pattern reference point stored in said coordinate storage means in filling of a new scan line, a pattern address determination means to determine the address on the memory corresponding to the coordinate of said reference point of the new pattern and a scan line address determination means to calculate the address on the memory corresponding to the coordinate of the ends of said newly filled scan line, as well as a second processor provided with a data processing means to read a filing pattern from said pattern address on the memory and scan line data from said scan line address on the memory, to perform predetermined processing using said filling pattern and said scan line data and to write the result to said scan line address and an address update means to update said pattern address and said scan line address.

According to another preferred embodiment, the first processor transfers said pattern address and scan line address data to said second processor and is further provided with a control means to instruct the start of processing to the second processor upon completion of the data transfer.

Other objects, characteristics and effects of the present invention will be clarified by the detailed description below.

DESCRIPTION OF THE PREFERRED EMBODIMENT

Referring to the attached drawing figures, preferred embodiments of a figure filling device according to the present invention will be described.

Figure 1:
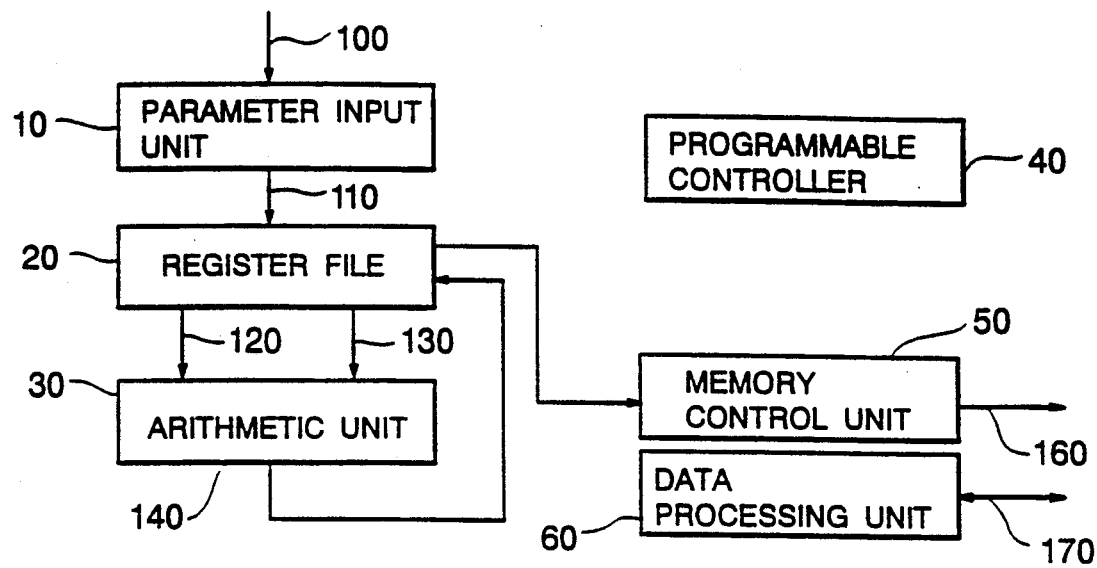
FIG. 1 is a block diagram to show the configuration of a figure filling device according to a first embodiment of the present invention.

FIG. 1 is a block diagram to show the configuration of a figure filling device according to a first embodiment of the present invention. This embodiment realizes the scan line fill supporting arbitrarily sized tiling patterns on relatively simple hardware.

A figure filling device according to this embodiment comprises a parameter input unit 10, a register file 20 provided with a plurality of registers, an arithmetic unit 30, a programmable controller 40, a memory control unit 50 and a data processing unit 60. The numerals 100 to 170 indicate buses. Control signals output from the programmable controller 40 to other components are omitted here.

The parameter data input to the device (coordinate data for scan lines and tiling pattern reference points as described later) are provided from the parameter input unit 10 via the bus 100 and stored in the predetermined register in the register file 20 comprising a plurality of registers. The processing starts when all parameters have been input. When the device is reset, all registers in the register file 20 are initialized to "0". The output from this register file 20 is connected with two inputs of the arithmetic unit 30 via the buses 120 and 130.

Figure 5:
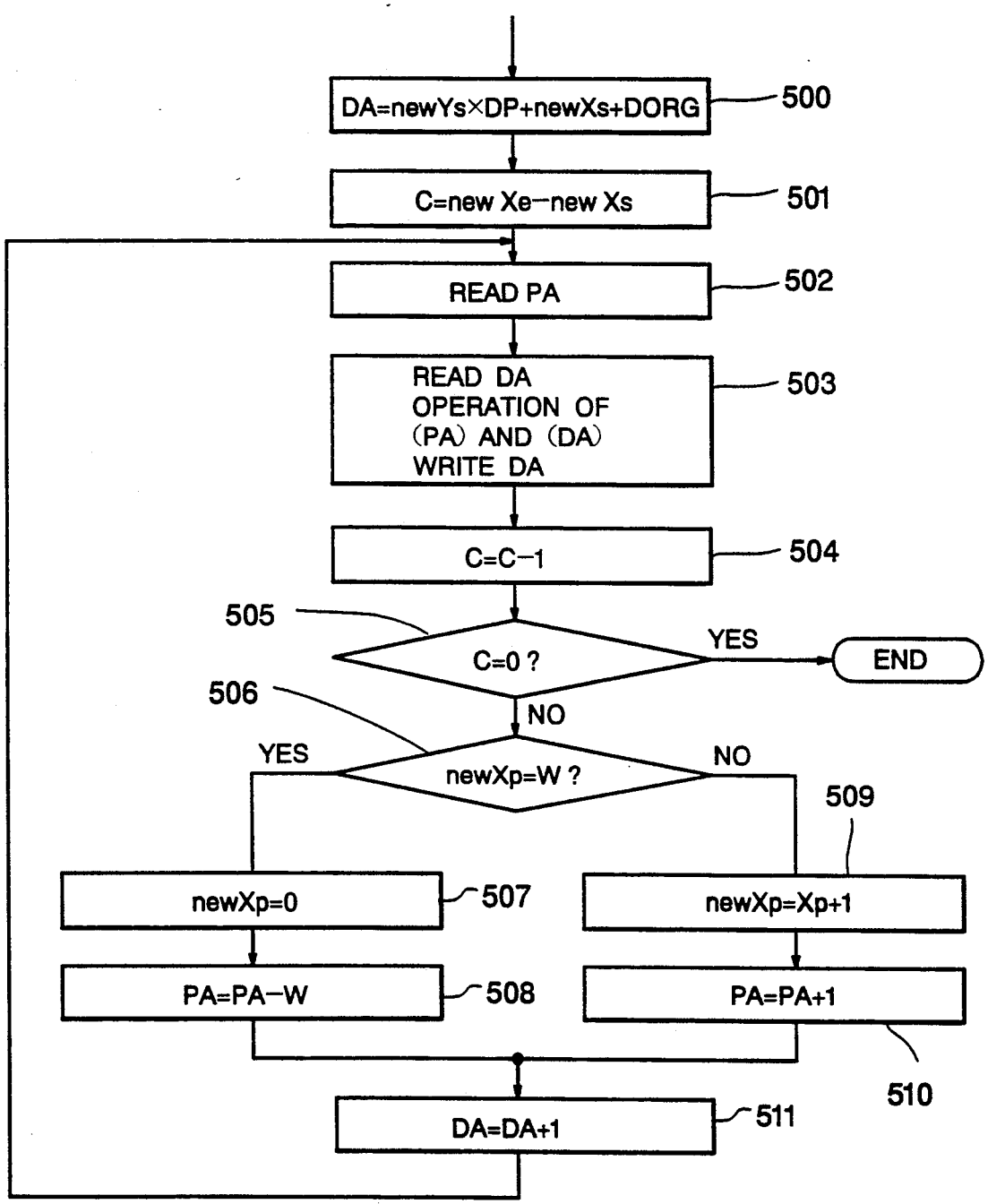
FIG. 5 is a flowchart to illustrate the contents of the actual filling processing by the figure filling device in FIG. 1.

The flow of processing is controlled by the programmable controller 40, which outputs all control signals such as operation timing signals and selection signals for access to the register file 20, the arithmetic unit 30, the memory control unit 50 and the data processing unit 60. The programmable controller 40 is provided with a program for figure filling as shown in FIGS. 2 and 5.

Figure 2:
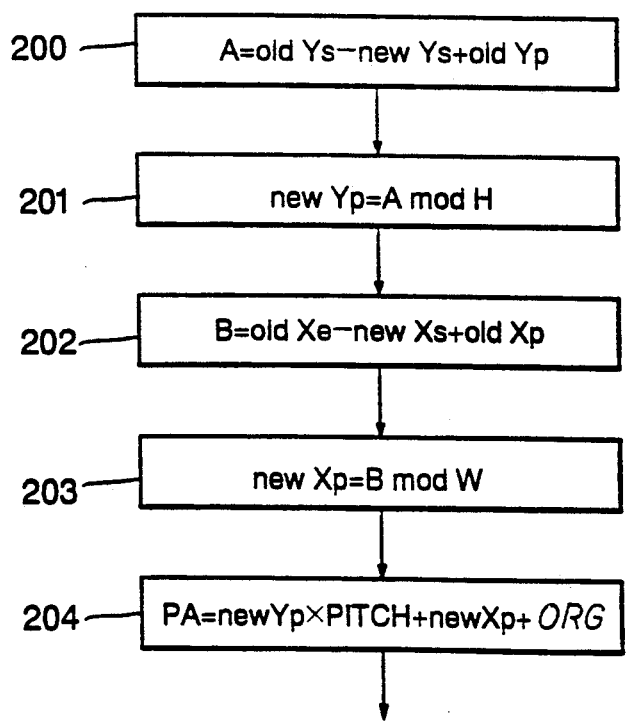
FIG. 2 is a flowchart to illustrate the contents of the preprocessing by the figure filling device in FIG. 1.
Figure 3:
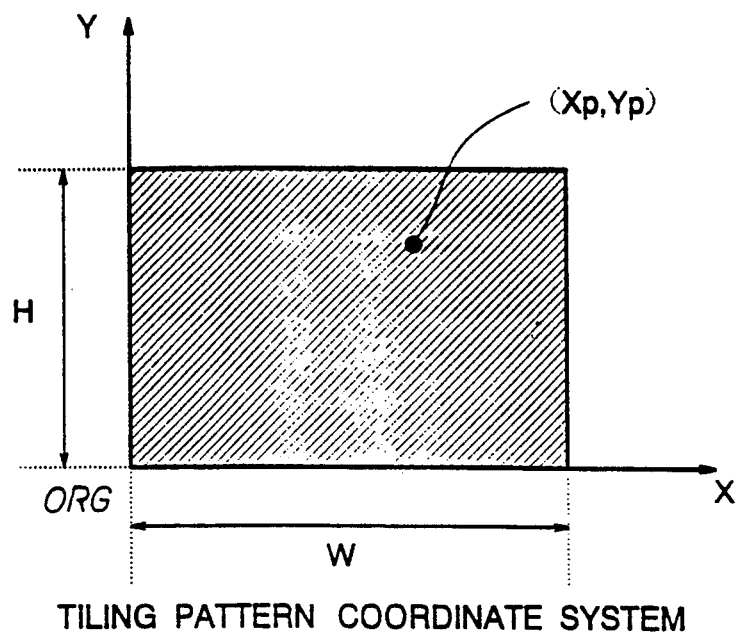
FIG. 3 is a diagram to show an example of a tiling pattern coordinate system.
Figure 4:
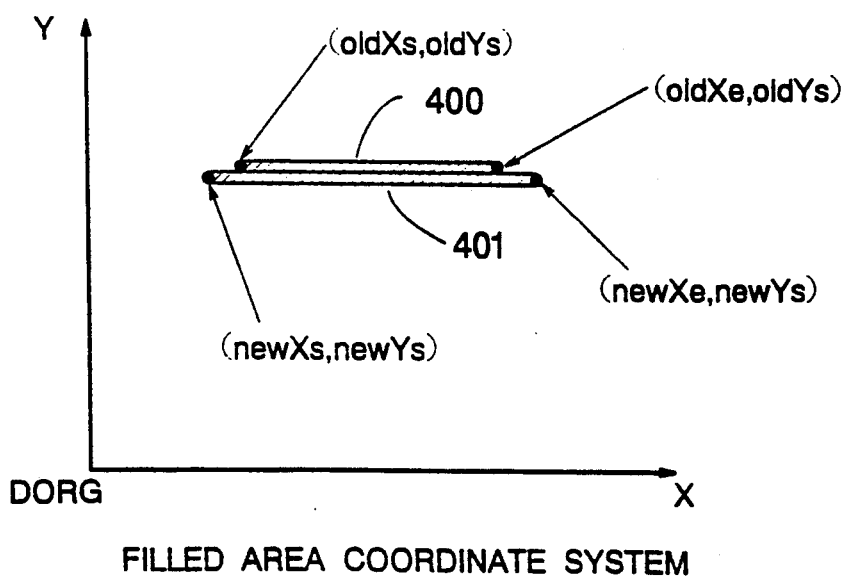
FIG. 4 is a diagram to show an example of coordinate system for area to be filled.

Now referring to FIGS. 2, 3 and 4, determination of reference points of tiling patterns (preprocessing) is described.

FIGS. 3 and 4 show coordinates for the tiling pattern and the area to be filled. The tiling pattern coordinate system in FIG. 3 has the origin of coordinates "ORG", which is an arbitrarily given address, and defines the width of the tiling pattern "W" and its height "H". In this system, any tiling pattern can be selected from a plurality of tiling patterns by updates with using the origin "ORG" as the pointer. Besides, a tiling pattern can be made to any size by change of the pattern width "W" and the height "H". FIG. 3 shows a shaded tiling pattern.

The origin of the coordinate system for the area to be filled (subjected to drawing) in FIG. 4 can be set independently from that of the tiling pattern coordinate system. The filled area in the figure is divided into two scan lines 400 and 401. The scan lines 400 and 401 are continuous in the Y coordinate direction. In other words, the Y coordinate of the scan line 400 is larger than the Y coordinate of the scan line 401 by "1". These scan lines 400 and 401 are filled by pasting the tiling pattern as shown in FIG. 3. Suppose the start point of the scan line already filled is (oldXs, oldYs), and its end point is (oldXe, oldYe); and the start point of the scan line to be newly filled is (newXs, newYs), and its end point (newXe, newYe).

FIG. 2 shows the contents of preprocessing for fill processing, which characterizes the present invention. Referring to FIG. 2, the Y coordinate for the reference start point of the tiling pattern "newYp" is determined in Steps 200 and 201. The value "A" in Step 200 is obtained by adding the difference between the Y coordinate "oldYs" for the previously processed scan line and the Y coordinate "newYs" for the scan line to be presently processed to the Y coordinate "oldYp" at the reference end point of the tiling pattern previously referenced. The remainder (mod) when dividing this "A" by the tiling pattern height "H" is the Y coordinate "newYp" at the reference start point of the tiling pattern.

In Steps 202 and 203, the X coordinate "newXp" at the reference start point of the tiling pattern is determined. The value "B" in Step 202 is obtained by adding the difference between the X coordinate "oldXp" for the end point of the previously processed scan line and the X coordinate "newXs" for the start point of the scan line to be presently processed to the Y coordinate "oldXp" for the reference end point of the tiling pattern previously referenced. The remainder (mod) when this "B" is divided by the tiling pattern width "W" is "newXp". In other words, coordinates for the new reference start point is determined by calculating the position in relation to the previous reference point. Step 204 is the determination of a real memory address "PA" based on such coordinate values. In Step 204, the Y coordinate "newYp" of the reference start point is multiplied by the width "PITCH" of the entire tiling pattern coordinate system, and the X coordinate "newXp" of the reference start point and coordinate data of the origin "ORG" of the area where the tiling pattern is stored are added to the product of the above multiplication so as to determine the memory address "PA" from X-Y coordinates.

Referring to the configuration shown in FIG. 1, the flow of data in preprocessing shown in FIG. 2 is described now. The register file 20 stores as parameters the start point coordinates (oldXs, oldYs) and the end point coordinates (oldXe, oldYs) of the previously processed scan line, the start point coordinates (newXs, newYs) and the end point coordinates (newXe, newYe) of the newly filled scan line, coordinates of the reference end point (oldXp, oldYp) of the previously referenced tiling pattern, width "W" and height "H" of the tiling pattern and other data according to the predetermined order.

In execution of Step 200, the data at the addresses storing the Y coordinate "oldYs" for the reference end point of the previously referenced tiling pattern and the Y coordinate "newYs" for the presently processed scan line are read and input to the arithmetic unit 30. The arithmetic unit 30 determines the difference between the Y coordinate "oldYs" and the Y coordinate "newYs" and the result is stored via the bus 140 into the work register in the register file 20. The procedure up to here takes one clock. Then, the work register and the register storing the "oldYp" are read and subjected to addition at the arithmetic unit 30 and the result "A" is stored in the work register in the register file 20.

Next, the work register storing the arithmetic operation result "A" and the register to store the height "H" of the tiling pattern are read for remainder determination according to Step 201 at the arithmetic unit 30. The result of this determination is stored in the register as "newYp". The X coordinates in Steps 202 and 203 are also subjected to the same operation. The arithmetic unit 30 multiplies the "newYp" determined according to Step 204 by the width "PITCH" of the pattern coordinate space and adds "newYp" to the product of the above multiplication. By further adding the origin "ORG" of the area storing the tiling pattern, the pattern address "PA" can be determined.

Now referring to the flowchart of FIG. 5, the fill processing executed after the completion of the above preprocessing is described.

In Step 500, the drawing address "DA" for the area to be actually filled is determined. "DP" designates the drawing pitch and "DORG" the origin of the area. Step 501 is the procedure to determine the number of pixels to be filled. This value serves as the counter for the number of loops in the filling routine. In Step 502, a tiling pattern is read from the address "PA". In Step 503, data are read from the address "DA" in the filled area and subjected to the predetermined operation with the already read tiling pattern and the operation result is rewritten to the address "DA". The predetermined operation here means so-called raster operation. Examples of such operation include replacement of the filled area with the read out tiling pattern and overwriting of the area. The number of loops is checked in Steps 504 and 505 and when the counter counts 0, the processing for one scan line is completed.

In Step 506, it is checked whether the reference point of the tiling pattern is at the right end. If so, the address and the X coordinate of the tiling pattern reference point are initialized in Steps 507 and 508. If not, both the X coordinate and the address are incremented in Steps 509 and 510. In Step 511, the filling address is incremented in horizontal direction. Thus, scan line fill is executed.

The determined address is transferred from the register file 20 to the memory control unit 50 via the bus 150 and then output to the external memory (not shown) via the bus 160. The data processing unit 60 inputs or outputs data to or from the external memory via the bus 170. The bus 170 for connecting with the external memory is an 8-bit bus.

Figures 7, 8:
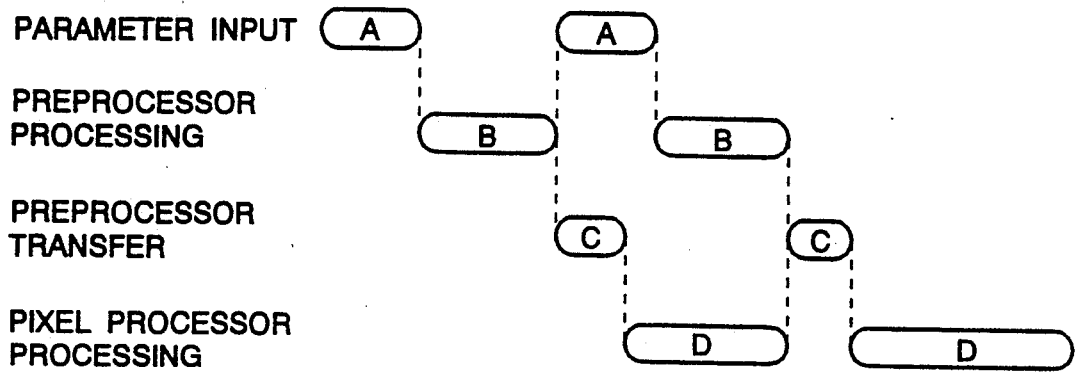
FIG. 7 is a diagram to show the procedures of pipeline processing by the figure filling device in FIG. 6.
FIG. 8 is a diagram to compare the preprocessing procedure by the present invention with that by conventional method.

FIG. 8 compares the time required for preprocessing between conventional method and the present invention. The conventional method does not require Steps 200 and 202, but in Step 201, needs five or six program loops of restoring method. Since a typical display unit has a resolution of 1280×1024 dots, coordinate representation of a point near the center of the screen requires about 10 significant bits for the X coordinate and 9 significant bits for the Y coordinate. Popular tiling patterns usually have about 4 significant bits vertically and horizontally, and the number of shifts equals the difference of their bits, which is 6 bits. Therefore, the loop of restoring is required 6 times for X and 5 for Y coordinates. The nearer the coordinates of the filled area is to 0, the smaller the number becomes, but approximately 75% area of the screen requires the above number of loops.

In contrast, the present invention generally requires only one restoring in Steps 201 and 203 particularly in a case where closely located areas are continuously filled such as in outline font function (scan lines are continuous in Y axis direction). The required number of execution clocks for instructions constituting the internal loop in Steps 201 and 203 is about 10 at least. Therefore, this invention can reduce the number of clocks to 30 clocks while the conventional method requires about 110 to 130 clocks for 11 to 13 loops in the entire step. As described above, the filling processing itself requires only 20 to 30 clocks for short scan lines, and what is essential is the improvement of calculation speed to obtain the reference start point for filling.

Figure 6:
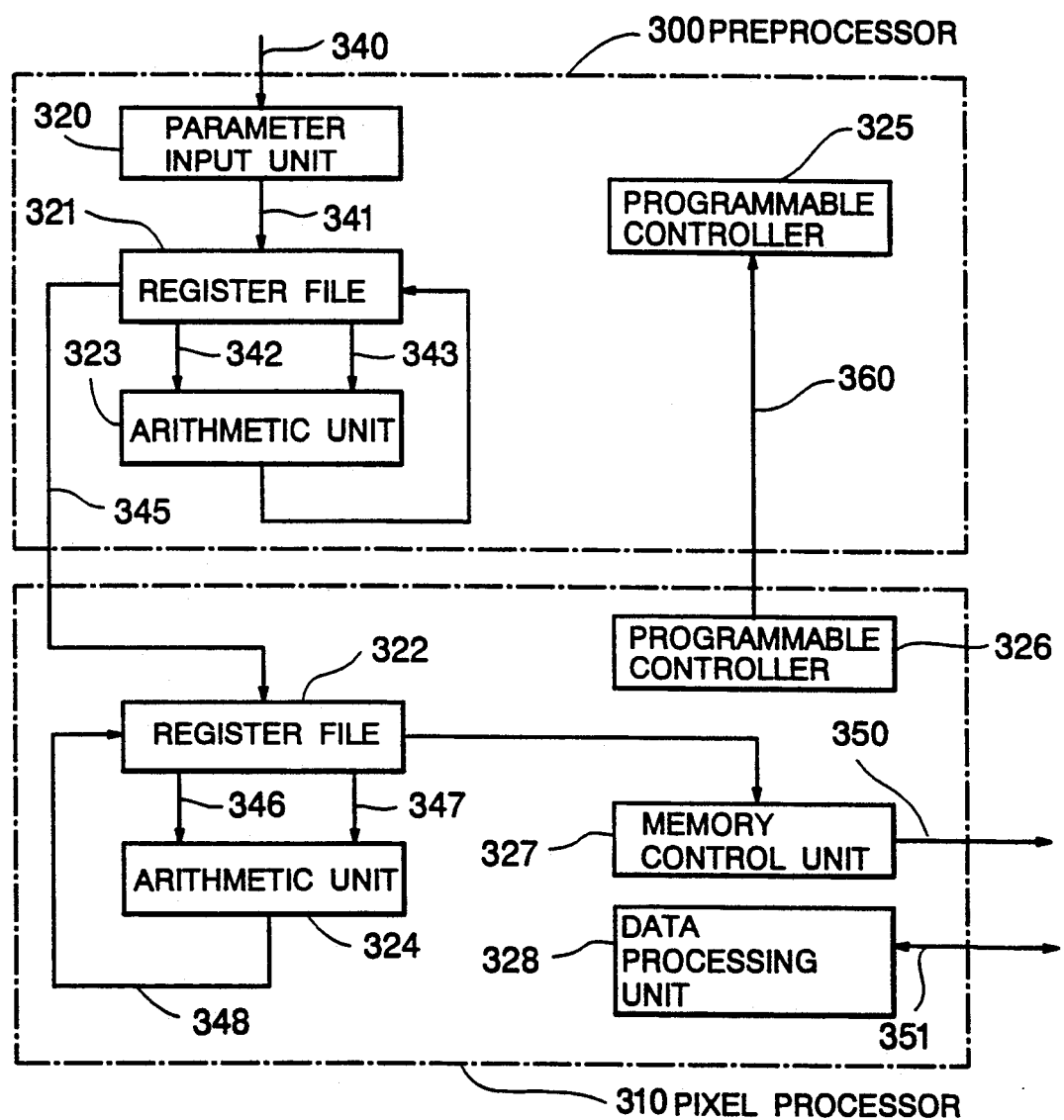
FIG. 6 is a block diagram to show the configuration of a figure filling device according to a second embodiment of the present invention.

Next, referring to FIG. 6, the configuration of a figure filling device according to a second embodiment of the present invention is described. In FIG. 6, a figure filling device of the present invention divides the scan line fill processing into two processes performed by a preprocessor 300 and a pixel processor 310.

The preprocessor 300 comprises a parameter input unit 320, a register file 321, an arithmetic unit 323, and a programmable controller 325. The pixel processor 310 comprises a register file 322, an arithmetic unit 324, a programmable controller 326, a memory control unit 327 and a data processing unit 328. The numerals 340 to 351 indicate buses and the numeral 360 indicates a busy signal. The busy signal 360 disables data transfer from the preprocessor 301 while the pixel processor 310 is in operation.

The basic algorithm is the same as in the first embodiment. The description here focuses on how the two processors share the processing.

The preprocessor 300 is in charge of Steps 200 to 204 in FIG. 2 and Steps 500 and 501 in FIG. 5. The five parameters obtained from these steps including the pattern address "PA", the drawing address "DA", the number of filled pixels "C", the pattern reference coordinate "Xp", the pattern width "W" are transferred to the pixel processor 310. The pixel processor 310 is in charge of Steps 502 to 511 in FIG. 5.

Next, referring to FIG. 6 and the pipeline processing as shown in FIG. 7, the operation of the two processors is described now. In FIG. 7, the time from parameter data input to the parameter input unit 320 via the bus 341 to the storing of data into the register file 321 via the bus 341 is indicated by "A". Upon completion of data input, the preprocessor 300 starts the processing at the timing "B". The preprocessor 300 transfers the processed data to the pixel processor 310 at the timing "C". Upon completion of data transfer, the pixel processor 310 starts processing at the timing "D". At the same time, new parameters can be input to the preprocessor 300. Therefore, two scan lines can be filled simultaneously in the order of A, B, C and D.

In FIG. 7, the processing time for "A" and "B" at the second time and thereafter is hidden behind the processing time for "D". In other words, thanks to the effect of pipeline processing, the total processing time depends solely on the time "C" for transfer to the pixel processor 310 and the processing time "D" at the pixel processor 310 in the steady state. In addition, even if the processing time at the preprocessor 300 is longer than that of the pixel processor 310, or the time A+B is longer than the time C+D, the total processing time is A+B. Therefore, when compared with the method using only one processor as in the first embodiment, the performance is expected to be improved twice at most. The components added to the first embodiment are a programmable controller 326, a register file 322, and an operation unit 324 only, resulting in much higher cost performance. For example, to double the processing speed of the device according to the first embodiment, doubled frequency may be used for the entire system, but this causes the price of the processor itself quite expensive and requires an external memory using doubled price chip, resulting in very high cost for the entire system.

The determination of the reference start point of a new tiling pattern is based on the reference end point of the previously processed tiling pattern in the first embodiment. However, it can be also realized using the reference start point of the previous tiling pattern. Such design is also in the scope of the preset invention. For relative determination of the reference point of the tiling pattern, the X coordinate of the scan line is updated for each drawing shown in FIG. 5 in the first embodiment. However, if such determination of reference start point of the new tiling pattern is based on the previous tiling pattern's reference start point as described above, the need of updating is eliminated.

When filling the area of more complicatedly shaped figures such as a triangle, a square, a trapezoid or other arbitrary polygons, so-called scan line conversion where the scan lines are determined based on the coordinates for the outline of the figure is required. For example, a triangle can be broken down into scan lines by generating X coordinates for two of the three edges at the same Y coordinate. This processing is to be performed with shifting the Y coordinate one by one. Accordingly, it is obvious that the scan line fill according to the present invention can be effectively applied to filling of any figure by means of combination with the higher level coordinate calculations.

The buses 170 and 351 for communication with the external memory in the first and the second embodiments have 8 bits, because they assume a 256 color display with 8 bits for one pixel. However, for the purpose of the present invention, the number of bits in such buses may be 16, 24 or any other value. In addition, when applied to a memory having a plurality of pixels in a word (so-called packed pixel configuration), the present invention can be easily realized by adding a shift and merge mechanism for pattern data at the data processing unit 60 or the data processing unit 328. The shift and merge mechanism is the technology in public domain adopted in commercially available LSI for graphics processing as the technology for transfer of data in a rectangular area or bit block transfer. The present invention can be realized for any pixel having any number of bits and any word length.

This invention does not limit the type of raster operation at the data processing unit 60 or 328. Besides, the address may be determined with the hardware multiplier incorporated in the arithmetic unit 30 or 323, or alternatively calculated by repetitive additions of microprogram control type in the above embodiment.

Obviously many modifications and variations of the present invention are possible. It is intended to cover in the appended claims all such modifications as fall within the true spirit and scope of the invention.

What is claimed is:

1. A figure filling device to fill a figure stored in a memory defined by X-Y coordinates, scan line by scan line, with reference to a specified fill pattern comprising:

a coordinate storage means to store coordinate data for ends of a scan line to be newly filled, coordinate data for ends of a previously processed scan line, and coordinate data for a reference point of a previous pattern, a pattern coordinate determination means to determine coordinate data for a reference point of a new pattern by processing coordinate data for ends of a scan line to be newly filled, the coordinate data for the ends of the previously processed scan line and the coordinate data for the reference point of the previous pattern stored in said coordinate storage means in filling of a new scan line, a pattern address determination means to determine the address in the memory corresponding to the coordinate of said reference point of the new pattern, a scan line address determination means to calculate the address in the memory corresponding to the coordinate of the ends of said newly filled scan line, a data processing means to read a filling pattern from said pattern address in the memory and scan line data from said scan line address in the memory, to perform predetermined processing using said filling pattern and said scan line data and to write a result to said scan line address, and an address update means to update said pattern address and said scan line address.

2. A figure filling device of claim 1 wherein said processing where said pattern coordinate determination means determines the coordinates for the reference point of the new pattern comprises a procedure to subtract a Y coordinate for the ends of said new scan line from a Y coordinate for the ends of said previous scan line and to add a Y coordinate of the reference point of said previous pattern, a procedure to take the remainder from the division to divide the result of the above operation regarding the Y coordinate by the height of the new pattern as the Y coordinate for the reference point of the new pattern, a procedure to subtract an X coordinate of the ends of said new scan line from an X coordinate of the ends of said previous scan line and to add an X coordinate for the reference point of said previous pattern, and a procedure to take the remainder form the division to divide the result of the above operation regarding the X coordinate by the height of the new pattern as the X coordinate for the reference point of the new pattern.

3. A figure filling device to fill a figure stored in a memory defined by X-Y coordinates, scan line by scan line, with reference to a specified fill pattern comprising:

a first processor and a second processor, said first processor including:

a coordinate storage means to store coordinate data for ends of a scan line to be newly filled, coordinate data for ends of a previously processed scan line, and coordinate data for a pattern reference point, a coordinate determination means to determine coordinate data for a reference point of a new pattern by processing coordinate data for ends of a scan line to be newly filled, the coordinate data for the ends of the previously processed scan line stored in said coordinate storage means in filling of a new scan line, said coordinate determination means using a remainder from division where a value obtained by adding a difference between the coordinates for the ends of said new scan line from the coordinates for the ends of said previously processed scan line to said reference point of the previous pattern by a height and a width of said new scan line as the coordinate data of the reference point of the new pattern, a pattern address determination means to determine the address in the memory corresponding to the coordinate of said reference point of the new pattern and a scan line address determination means to calculate the address in the memory corresponding to the coordinate of the ends of said newly filled scan line, and said second processor including:

a data processing means to read a filing pattern from said pattern address in the memory and scan line data form said scan line address int he memory, to perform predetermined processing using said filling pattern and said scan line data and to write a result to said scan line address, and an address update means to update said pattern address and said scan line address.

4. A figure filling device to fill a figure stored in a memory defined by X-Y coordinates, scan line by scan line, with reference to a specified fill pattern comprising:

a coordinate storage means to store coordinate data for ends of a scan line to be newly filled, coordinate data for ends of a previously processed scan line, and coordinate data for reference point of a previous pattern, a pattern coordinate determination means to determine coordinate data for a reference point of a new pattern by processing coordinate data for ends of a scan line to be newly filled, the coordinate data for the ends of the previously processed scan line and the coordinate data for the reference point of the previous pattern stored in said coordinate storage means in filling of a new scan line, said pattern coordinate determination means using a remainder from division where a value obtained by adding a difference between the coordinates for the ends of said new scan line from the coordinates for the ends of said previously processed scan line to said reference point of the previous pattern by a height and a width of said new scan line as the coordinate data of the reference point of the new pattern, a pattern address determination means to determine the address in the memory corresponding to the coordinate of said reference point of the new pattern, a scan line address determination means to calculate the address in the memory corresponding to the coordinate the ends of said newly filled scan line, a data processing means to read a filling pattern form said pattern address in the memory and scan line data form said scan line address in the memory, to perform predetermined processing using said filling pattern and said scan line data and to write a result to said scan line address, and an address update means to update said pattern address and said scan line address.

5. A figure filling device to fill a figure stored in a memory defined by X-Y coordinates, scan line by scan line, with reference to a specified fill pattern comprising:

a first processor and a second processor, said first processor including:

a coordinate storage means to store coordinate data for ends of a scan line to be newly filled, coordinate data for ends of a previously processed scan line, and coordinate data for a pattern reference point, a coordinate determination means to determine coordinate data for a reference point of a new pattern by processing coordinate data for ends of a scan line to be newly filled, the coordinate data for the ends of the previously processed scan line stored in said coordinate storage means in filling of a new scan line, a pattern address determination means to determine the address in the memory corresponding to the coordinate of said reference point of the new pattern, a scan line address determination means to calculate the address in the memory corresponding to the coordinate of the ends of said newly filled scan line, a control means to transfer said pattern address and scan line address data to said second processor and to instruct a start of processing to the second processor upon completion of data transfer, and said second processor including:

a data processing means to read a filing pattern from said pattern address in the memory and scan line data form said scan line address in the memory, to perform predetermined processing using said filling pattern and said scan line data and to write a result to said scan line address, and an address update means to update said pattern address and said scan line address.

* * * * *